(12) United States Patent
Liu

(10) Patent No.: US 8,218,979 B2
(45) Date of Patent: Jul. 10, 2012

(54) SYSTEM, METHOD AND APPARATUS FOR COHERENT OPTICAL OFDM

(75) Inventor: Xiang Liu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 566 days.

(21) Appl. No.: 12/495,779

(22) Filed: Jun. 30, 2009

(65) Prior Publication Data

US 2010/0329683 A1 Dec. 30, 2010

(51) Int. Cl.
H04B 10/06 (2006.01)

(52) U.S. Cl. .................................... 398/208; 398/202

(58) Field of Classification Search ............. 398/208, 398/202
See application file for complete search history.

(56) References Cited

U.S. PATENT DOCUMENTS

| | | | |
|---|---|---|---|
| 7,693,429 B1* | 4/2010 | Lowery | 398/192 |
| 8,111,993 B2* | 2/2012 | Lowery et al. | 398/81 |
| 8,112,001 B2* | 2/2012 | Lowery et al. | 398/158 |
| 2009/0220239 A1* | 9/2009 | Armstrong et al. | 398/81 |
| 2009/0257344 A1* | 10/2009 | Huang et al. | 370/210 |
| 2009/0324223 A1* | 12/2009 | Liu | 398/65 |
| 2009/0324226 A1* | 12/2009 | Buchali et al. | 398/76 |
| 2010/0104284 A1* | 4/2010 | Liu et al. | 398/65 |
| 2010/0142952 A1* | 6/2010 | Qian et al. | 398/65 |
| 2010/0196009 A1* | 8/2010 | Qian et al. | 398/65 |
| 2011/0064421 A1* | 3/2011 | Zhang et al. | 398/208 |
| 2011/0129041 A1* | 6/2011 | Ishihara et al. | 375/340 |
| 2011/0305453 A1* | 12/2011 | Hauske et al. | 398/38 |

OTHER PUBLICATIONS

Chen chen et al; Reduced guard interval CO-OFDM with overlapped frequency domain CD and PMD equalization; 2011; optical society of America; pp. 1-3.*

K.Ishihara et al; Frequency domain equalisation without guard interval for optical transmission systems; Dec. 2008; Electronics letters vol. 44 No. 25.*

Alex Tolmachev et al; Filter bank based efficient transmission of reduced guard interval OFDM; Nov. 2011; optical society of America.*

Chen chen et al; Zero guard interval coherent optical OFDM with overlapped frequency domain CD and PMD equalization; Apr. 2011; optical society of America.*

Yue-Kai Huang et al; Transmission of Spectral efficient super-channels using all optical OFDM and Digital coherent receiver technologies; Dec. 2011; Journal of lightwave technology vol. 29 No. 24; pp. 3838-3844.*

(Continued)

*Primary Examiner* — Kenneth N Vanderpuye
*Assistant Examiner* — Amritbir Sandhu
(74) *Attorney, Agent, or Firm* — David M. La Bruno

(57) ABSTRACT

Digital compensation of chromatic dispersion (CD) effect experienced by optical orthogonal frequency-division multiplexed (OFDM) signal in fiber transmission is provided in the frequency domain using a Fast Fourier Transform/Inverse Fast Fourier Transform (FFT/IFFT) pair with equal length of digital samples prior to OFDM receiver signal processing, wherein the equal length is larger than the length of a FFT used for OFDM subcarrier demultiplexing of the received signal. The OFDM signal processing is independent of fiber CD, so small guard-interval (GI) can still be used to achieve high spectral efficiency even under the experience of large CD. The GI need only to be large enough to accommodate other effects such as polarization-mode dispersion. The length of an IFFT used for OFDM subcarrier multiplexing, as well as the FFT for OFDM demultiplexing can be sufficiently small so subcarrier spacing is sufficiently large to tolerate typical frequency offsets between the transmitter laser and the optical local oscillator.

21 Claims, 2 Drawing Sheets

OTHER PUBLICATIONS

Xiang liu et al; 448-Gb/s Reduced guard interval CO-OFDM transmission over 2000 Km of ultrlarge Area fiber and five 80 GHz grid ROADMS Feb. 2011; Journal of lightwave technology vol. 29 No. 4; pp. 483-490.*

Sander L.Jansen et al LOng-haul transmission of 16×52.5 Gbits/s polarization-division-multiplexed OFDM enabled by MIMO processing; Feb. 2008; optical societyof America; pp. 173-182.*

Qi Yang et al; Demonstration of Frequency Domain Averaging Based Channel Estination for 40-Gb/s CO-OFDM with high PMD; 2009; optical society of America; pp. 1-3.*

P.Poggiolini et al ; Evaluation of the computational effort for chromatic dispersion compensation in coherent optical PM-OFDM and PM-QAM systems; Jan. 2009; optical society of America; pp. 1385-1403.*

Xiang Liu et al ; Transmission of a 448-Gb/s reduced guard interval CO-OFDM signal with a 60GHz optical Bandwidth over 2000 Km of ULAF and five 80-GHz-Grid ROADMS; 2010; OPtical Society of AMerica.*

Thomas Prant et al ; Adaptive Polarization Transmission of OFDM signals in channels with Polarization Mode dispersion and Polarization dependent loss; Jul. 2009; IEEE transactions on wireless communications, vol. 8 No. 7; pp. 3354-3359.*

* cited by examiner

| System Reach | The Conventional Approach | | The Proposed Approach | |
|---|---|---|---|---|
| | Overhead (%) | $|\Delta f_{max}|$ (MHz) | Overhead (%) | $|\Delta f_{max}|$ (MHz) |
| 1,500-km SSMF | 25% (512/2048) | 13.7 MHz (56GHz/2048/2) | 6.25% (8/128) | 218 MHz (56GHz/128/2) |
| | 50% (512/1024) | 27.3 MHz | 6.25% | 218 MHz |
| | 100% (512/512) | 54.7 MHz | 6.25% | 218 MHz |
| 3,000-km SSMF | 50% (1024/2048) | 13.7 MHz | 6.25% | 218 MHz |
| | 100% (1024/1024) | 27.3 MHz | 6.25% | 218 MHz |
| | 200% (1024/512) | 54.7 MHz | 6.25% | 218 MHz |

*FIG. 2*

SYSTEM, METHOD AND APPARATUS FOR COHERENT OPTICAL OFDM

FIELD OF THE INVENTION

The invention relates to optical transmission systems, and, in particular, to systems, apparatuses and techniques for compensation of fiber dispersion in coherent optical orthogonal frequency-division multiplexing (CO-OFDM) systems.

BACKGROUND INFORMATION

Orthogonal frequency-division multiplexing (OFDM) is a widely used digital modulation/multiplexing technique. Coherent optical orthogonal frequency-division multiplexing (CO-OFDM) is being considered as a promising technology for future high-speed (e.g., 100-Gb/s per-channel data rate) optical transport systems. In high-speed long-haul optical fiber transmission based on CO-OFDM, large guard-interval (GI) between adjacent OFDM symbols is needed to accommodate fiber chromatic dispersion (CD) induced inter-symbol interference (ISI).

Chromatic dispersion (CD) is a deterministic distortion given by the design of the optical fiber. It leads to a frequency dependence of the optical phase and its effect on transmitted signal scales quadratically with the bandwidth consumption or equivalently the data rate. Therefore the CD tolerances are reduced to $\frac{1}{16}$, if the data rate of a signal is increased by a factor of four (4). Up to 2.5 Gb/s data rate optical data transmission is feasible without any compensation of CD even at long haul distances. At 10 Gb/s, the consideration of chromatic dispersion becomes necessary, and dispersion compensating fibers (DCF) are often used. At 40 Gb/s and beyond, even after the application of DCF the residual CD may still be too large for feasible optical communication.

Another transmission impairment experienced in CO-OFDM transmission is Polarization-Mode Dispersion (PMD), which is a stochastic characteristic of optical fiber due to imperfections in production and installation. Pre-1990 fibers exhibit high PMD values well above 0.1 ps/$\sqrt{\text{km}}$ which are border line even for 10 Gb/s. Newer fibers have a PMD lower than 0.1 ps/$\sqrt{\text{km}}$, but other optical components in a fiber link such as reconfigurable add/drop multiplexers (ROADMs) may cause substantial PMD. If 40 Gb/s systems are to be operated over the older fiber links or over new fiber links with many ROADMs, PMD may become a significant detriment. PMD can be compensated by optical elements with an inverse transmission characteristics to the fiber. However, due to the statistical nature of PMD with fast variation speeds up to the few kHz range, the realization of optical PMD compensators is challenging. With increases in channel data rate, optical signal is more and more limited by the transmission impairments in optical fiber, such as by CD and PMD.

The insertion of large GI between adjacent OFDM symbols to accommodate large CD leads to substantial reduction of transmission spectral efficiency (SE) when the GI becomes a large fraction of the OFDM symbol length. One obvious way to solve this problem is to proportionally increase the OFDM symbol length so the overhead due to the GI remains low, however, this leads to proportionally large reduction in the frequency spacing between OFDM subcarriers, which in turn leads to unacceptably high requirement on the optical frequency locking between the transmitter laser and the receiver optical local oscillator (OLO). In order to enable high-speed CO-OFDM to be spectrally efficient and tolerant to the frequency offset between the OLO and the transmitter laser in the presence of large fiber dispersion, according to a scheme commonly referred to as "No-Guard-Interval Coherent OFDM", the GI removed, and blind equalization at the receiver relied on to compensate for fiber dispersion.

SUMMARY OF THE INFORMATION

Large dispersion tolerance in high-speed optical transmission is desirable. However, systems that utilize No-Guard-Interval Coherent OFDM suffer several shortcomings. For example, without the GI, the blind equalization at the receiver necessary to mitigate fiber transmission impairments such as CD and PMD require additional computational load beyond that required by a conventional CO-OFDM scheme. Further, in No-Guard-Interval Coherent OFDM, no digital signal processing (DSP) and digital-to-analog (D/A) conversion are applied at the transmitter, so no training symbols can be inserted at the transmitter to facilitate the channel estimation at the receiver. This further detriment makes the estimation of the channel response more difficult as compared to the conventional CO-OFDM scheme. Without DSP at the transmitter, it is also not possible to insert pilot subcarriers to facilitate the estimation of the phase drift between the transmitter laser and the OLO. Moreover, data rate/format adaptation is not possible in No-Gaurd-Interval Coherent OFDM due to the lack of transmitter-side DSP. In short, the existing "No-Guard-Interval Coherent OFDM" solution requires higher DSP complexity and power in recovering the data as compared to the conventional CO-OFDM approach, and lacks the data rate/format adaptation capability offered by the conventional CO-OFDM.

System, method and apparatus embodiments are provided for high spectrial efficiency (HSE) coherent optical orthogonal frequency-division multiplexing (CO-OFDM) with large dispersion tolerance. Embodiments of the invention enable high-speed (e.g., 100$^+$ Gb/s) CO-OFDM to be highly spectrally efficient and tolerant to the frequency offset between the OLO and the transmitter laser in the presence of large fiber dispersion. Exemplary embodiments include steps and structure to perform compensation to accommodate dispersion, including Chromatic Dispersion (CD).

An exemplary method embodiment according to the invention includes compensating in an optical Orthogonal Frequency Division Multiplexing (OFDM) receiver for chromatic dispersion (CD) experienced by a received signal, wherein said compensating is performed in the frequency-domain using a Fast Fourier Transform/Inverse Fast Fourier Transform (FFT/IFFT) pair with equal length of digital samples ($N_{fft}^{CD} = N_{ifft}^{CD}$) prior to OFDM receiver signal processing, wherein the equal length is greater than the length of a FFT used for OFDM subcarrier demultiplexing of the received signal ($N_{fft}^{OFDM}$). The compensating of the method may utilize an overlap-and-add approach. In one embodiment, the overlap-and-add approach includes grouping incoming samples of the received signal into overlapped blocks, each block having a first length of total samples that equals $N_{fft}^{CD}$ and $N_{ifft}^{CD}$, and a second length of samples overlapping with each left and right neighboring blocks. For example, each block may have a first length of two-thousand-forty-eight (2048) samples and a second length of two-hundred-seventy-four (274) overlapping samples with each left and right neighboring blocks. Other lengths may be utilized.

In an embodiment, the time duration corresponding to each block may be at least twice as large as the CD-induced channel memory duration. The CD-induced channel memory duration can be conveniently estimated by the product of the amount of CD and the spectral bandwidth of the OFDM signal. For example, after transmission over 1,600 km standard single-mode fiber (SSMF) having a CD coefficient of 17 ps/nm/km, the amount of CD is 27,200 ps/nm, and the CD-induced channel memory duration for an optical OFDM signal with 0.4-nm bandwidth is then 10,880 ps. Assuming a sampling frequency of 50 GHz (or 50 GSamples/s) for the digital samples, the time duration of each sample is 20 ps, and the CD-induced channel memory duration then lasts 544 samples. Selecting the first length of total samples in each block to be 2048 satisfies the condition that the time duration corresponding to each block is at least twice as large as the CD-induced channel memory duration. The time duration corresponding to the second length of overlapping samples is preferably larger than half of the CD-induced channel memory duration (272) in another embodiment. Selecting the second length to be 274 satisfies this condition.

In OFDM receiver, it is desired to control the OLO frequency to be within half of the OFDM subcarrier spacing away from the transmitter laser frequency to facilitate frequency estimation. Thus, it is desired to make the OFDM subcarrier spacing as large as possible to ease the frequency stabilization task. In one embodiment, the equal length is $2^N$ times as long as the length of the FFT used for OFDM subcarrier demultiplexing, wherein N is a positive integer. The length of the FFT used for OFDM subcarrier demultiplexing, $N_{fft}^{OFDM}$, is chosen to satisfy the condition $N_{fft}^{OFDM} < f_s^{RX}/(100 \text{ MHz})$, where $f_s^{RX}$ is a sampling frequency at which the digital samples are sampled. This condition assures that the OFDM subcarrier spacing ($f_s^{RX}/N_{fft}^{OFDM}$) is >100 MHz, so that the allowable range of laser frequency offset between the transmitter laser and the OLO is at least [−50 MHz, 50 MHz]. This makes the practical realization of laser frequency stabilization feasible.

In an embodiment, compensating for CD includes converting the digital samples representing the received signal from the time domain to the frequency domain by using the FFT of length $N_{fft}^{CD}$; imposing a frequency-dependent phase profile on the converted frequency-domain samples; and converting the frequency-domain samples back to the time domain by using the IFFT of length $N_{ifft}^{CD}$. The imposed frequency-dependent phase profile may be approximately opposite to that imposed by the CD experienced by the received signal. The frequency-dependent phase profile imposed by fiber CD may also be estimated from iteration using several guess values for the CD.

OFDM receiver signal processing may include at least one of frame synchronization, frequency estimation, OFDM subcarrier de-multiplexing, training-symbol assisted channel estimation and compensation, frequency offset compensation, phase estimation and compensation, demodulation, and data recovery. In one embodiment, the method may also include receiving a signal having a Guard Interval (GI) having a duration independent of the CD induced channel memory duration. The received signal may have a GI with a length longer than a memory length associated with PMD. For example, the GI can be set to be at least 3<DGD>, where <DGD> is the mean differential group delay (DGD) associated with PMD. In common high-speed optical transmission systems, <DGD> is usually less than 30 ps, so the GI can be set to be 100 ps, or 5 samples if a sampling frequency of 50 GSamples/s is used.

In one embodiment, an optical communication system includes an optical Orthogonal Frequency-Division Multiplexed (OFDM) receiver for receiving an optical OFDM signal, the optical OFDM receiver including a compensation module configured to compensate the received optical OFDM signal for fiber dispersion experienced thereupon during transmission, the module including a Fast Fourier Transform/Inverse Fast Fourier Transform (FFT/IFFT) pair configured to compensate the optical OFDM signal in the frequency domain, the FFT/IFFT pair having an equal first length of digital samples ($N_{fft}^{CD} = N_{ifft}^{CD}$), the first length greater than a second length of a FFT used for subcarrier demultiplexing the received signal ($N_{fft}^{OFDM}$). In one embodiment, the first length is a multiple of the second length. In another embodiment, the first length may be $2^N$ times a long as the second length. For instance, the first length may be two-thousand-forty-eight (2048) and the second length may be one-hundred-twenty eight (128) samples, so the first length is sixteen ($2^4$) times as long as the second length.

In another embodiment, the optical OFDM receiver may further include at least one of a frame synchronization module, a frequency estimation module, a subcarrier de-multiplexing module, a training-symbol assisted channel estimation and compensation module, a frequency offset compensation module, phase estimation and compensation module, a demodulation module, and a data recovery module for processing the received optical OFDM signal after compensation by the compensation module.

In one embodiment, the optical communication system further includes an optical OFDM transmitter for generating the optical OFDM signal provided to the optical OFDM receiver, the optical OFDM transmitter including an IFFT module of length $N_{ifft}^{OFDM}$ for subcarrier multiplexing, wherein $N_{ifft}^{OFDM}$ corresponds to the second length $N_{fft}^{OFDM}$. For example, $N_{ifft}^{OFDM}$ and $N_{fft}^{OFDM}$ may be equal in length or may differ if, for example, more oversampling is desired at the optical OFDM receiver.

In an embodiment, the OFDM transmitter may include a guard-interval (GI) insertion module configured to allocate a guard-interval (GI) that is at least 10 times shorter than the length of the IFFT module used for OFDM subcarrier multiplexing. In one embodiment, the length of the FFT used for OFDM subcarrier demultiplexing, $N_{fft}^{OFDM}$, satisfies $N_{fft}^{OFDM} < f_s^{RX}/(100 \text{ MHz})$, where $f_s^{RX}$ is a sampling frequency at which the digital samples are sampled. Likewise, the length of the IFFT used for OFDM subcarrier multiplexing, $N_{ifft}^{OFDM}$, may satisfies the condition $N_{ifft}^{OFDM} < f_s^{TX}/(100 \text{ MHz})$, where $f_s^{TX}$ is the sampling frequency of the digital-to-analog converter (DAC) used in the OFDM transmitter. This condition assures that the allowable range of laser frequency offset between the transmitter laser and the OLO is at least [−50 MHz, 50 MHz]. This makes the practical realization of laser frequency stabilization feasible.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein FIG. 2 is an illustrative table that compares the overhead and the maximum frequency offset between the OLO of the receiver and the transmitter laser in conventional OFDM to an embodiment of HSE-OFDM according to the invention.

DETAILED DESCRIPTION

Figure 1:
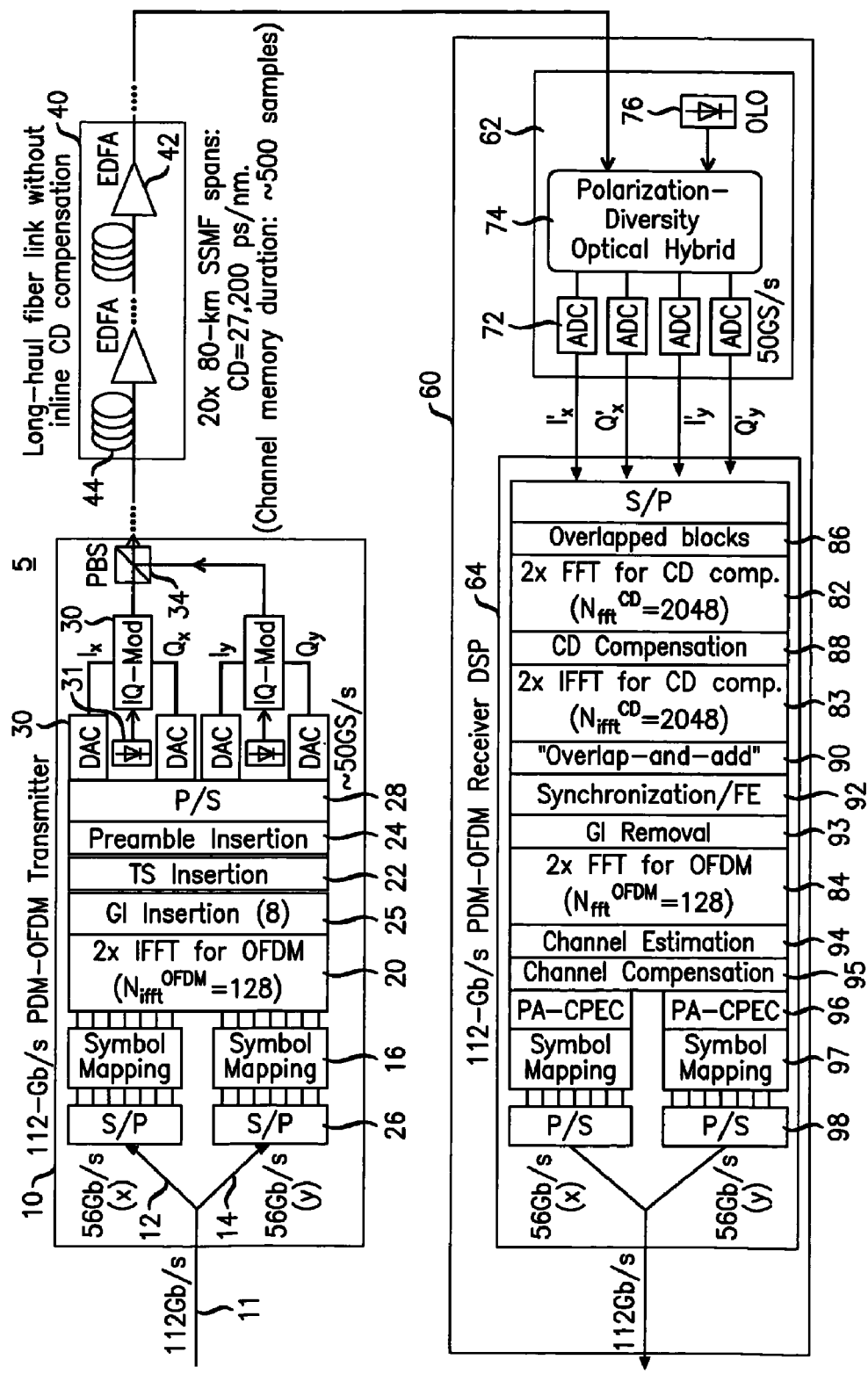
FIG. 1 is a schematic diagram of an exemplary optical transmission system that employs an embodiment of High Spectral Efficiency-OFDM (HSE-OFDM) for optical transmission links having large chromatic dispersion (CD) according to the invention.

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein, the term "and" is used in both the conjunctive and disjunctive sense and includes any and all combinations of one or more of the associated listed items. The singular forms "a", "an" and "the" are intended to include the plural forms as well, unless the context clearly indicates otherwise. It will be further understood that the terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is schematic diagram of an exemplary optical transmission system that employs High Spectral Efficiency-OFDM (HSE-OFDM) for optical transmission links having large chromatic dispersion (CD) according to the invention. In the exemplary optical transmission system 5, a 112-Gb/s PDM-OFDM transmitter 10 is connected via a dispersion managed transmission link 40 to a 112-Gb/s PDM-OFDM receiver 60. Other data rate signals can be handled in a similar manner.

At the transmitter 10, the original 112-Gb/s data 11 are first divided into x- and y-polarization branches 12 and 14 each of which is mapped by symbol mapping module 16 onto frequency subcarriers with modulation, which, are transferred to the time domain by an Inverse Fast Fourier Transform (IFFT) supplied by IFFT module 20. For example, each polarization branch 12 or 14 may be mapped onto eighty (80) frequency subcarriers with quadrature phase shift keying (QPSK) modulation, which, together with eight (8) pilot subcarriers, are transferred to the time domain by an IFFT of length $N_{ifft}^{OFDM}$ with a filling ratio of approximately seventy percent (~70%). Higher filling ratio is also possible. For example, in FIG. 1, $N_{ifft}^{OFDM}$ is one-hundred-twenty-eight (128). The eight (8) pilot subcarriers are preferably distributed uniformly in the frequency domain. Other numbers of frequency subcarrier, pilot subcarriers, and lengths of the IFFT for subcarrier multiplexing may be utilized.

Guard-Interval (GI) insertion module 25 allocates a guard-interval. According to one embodiment of the invention, the (GI) is shorter than the length of the IFFT used for OFDM subcarrier multiplexing. For example, the GI may be at least 10 times shorter than the length of the IFFT used for OFDM subcarrier multiplexing.

The guard-interval (GI) has a length of 8 samples, which is much shorter than the dispersion-induced channel memory duration (e.g., 544 samples in the example used previously) of the target transmission link, which consists of 20×80-km standard single-mode fiber (SSMF) spans in one embodiment. Note that in conventional OFDM, the GI length is designed to be longer than the channel memory duration in order to avoid inter-symbol interference (ISI). According to embodiments of the invention, the GI length only needs to be longer than the memory length associated with PMD, which is usually <100 ps. Using the example shown in FIG. 1 with 50-GSamples/s DAC and ADC, 8 samples last 160 ps, sufficient to accommodate typical PMD-induced ISI.

A pair of preambles may be inserted by preamble insertion module 24 into every 100 OFDM symbols to facilitate OFDM frame synchronization and frequency estimation. A pair of training symbols (TS) may be inserted by TS insertion extension module 22 to facilitate channel estimation. With 50-GSamples/s DAC and ADC, the maximum net data rate is then 113 Gb/s using the OFDM design parameters described above.

As another example, channel estimation for the CO-OFDM link may also be provided utilizing intra-symbol frequency-domain averaging (ISFA) to compensate for transmission impairments. In such an embodiment, a pair of training symbols in an optical OFDM signal are inserted and received, channel estimation performed to obtain a first estimated channel matrix for each of a plurality of subcarriers of the OFDM signal, and the first estimated channel matrix of a first subcarrier averaging with the first estimated channel matrix of at least one other subcarriers to obtain a second estimated channel matrix for the first subcarrier. Channel compensation is performed based on the second estimated channel matrix for the first subcarrier of the OFDM signal and as described in U.S. patent application Ser. No. 12/215,740 entitled System, Method And Apparatus For Channel Estimation Based on Intra-Symbol Frequency Domain Averaging For Coherent Optical OFDM, filed Jun. 20, 2008 and herein incorporated by reference.

In one embodiment, a pair of dual-polarization or polarization multiplexed training symbols may be used so that the overall power of each of the training symbols is the same as that of a PDM-OFDM payload symbol and the overall OFDM symbol sequence is of a constant power format in order to reduce the XPM penalty to other WDM channels caused by a non-uniform power waveform of a wavelength channel as described in U.S. patent application Ser. No. 12/215,740 entitled System, Method And Apparatus For Channel Estimation With Dual Polarization Training Symbols For Coherent Optical OFDM, filed Jun. 20, 2008 and herein incorporated by reference.

The IFFT algorithm is organized on a symbol basis requiring a parallelization via a serial-to-parallel module 26 of input data before application of the algorithm and a serialization via parallel-to-serial module 28 afterwards. After parallelization of data in the transmitter, a coder is required transferring a binary on-off coding into, for example, a four level phase modulation signal with the phase values of $[\pi/4, 3\pi/4, 5\pi/4, 7\pi/4]$.

The superposition of multiple frequency carriers leads to an analog signal in the time domain. Hence a digital-to-analog converter (DAC) 30 is required after serialization in the transmitter and opposite analog-to-digital converter (ADC) 72 in the receiver 60 in front of the digital signal processing. The DAC operates at a given sampling rate. For example, after the time-domain samples corresponding to the real and imaginary parts of one polarization component of the PDM-OFDM signal are serialized they may be converted by two approximately 50-GS/s DACs (e.g., 56-GS/s DACs).

The two analog waveforms converted by the two DACs are used to drive an I/Q modulator 32 to form one polarization component of the PDM-OFDM signal, which is then combined with the other polarization component of the PDM-OFDM signal (generated similarly) by a polarization beam splitter (PBS) 34 to form the original optical PDM-OFDM signal. Each of the two IQ modulators 32 are connected to a laser 31.

The orthogonal frequency-division multiplexed (OFDM) signal is carried via a transmission link 40 to a 112-Gb/s PDM-OFDM receiver 60. The optical link may be a long-haul fiber link without in inline CD compensation and include a number of Erbium-doped fiber amplifiers (EDFA) 42 and a number of fiber spans 44. The optical link will typically suffer from fiber nonlinearity, self-phase modulation (SPM), chromatic dispersion (CD), and polarization mode dispersion (PMD). For example, a link comprising twenty in number eighty km SSMF spans (i.e., 20×80-km SMMF spans) will suffer CD of 27,200 ps/nm and have a channel duration of approximately five hundred (i.e., ~500) samples.

At the receiver 60, digital coherent detection with polarization diversity is used to sample the fields of two orthogonal components of the received optical signal at the receiver front end 62. At the receiver, both the inphase (I) and quadrature (Q) components of the signal field for each of two orthogonal polarization components are sampled by a typical digital coherent receiver front-end. Thus, the receiver front end includes Polarization Diversity Optical Hybrid 74, an optical local oscillator 76 and analog-to-digital converters (ADC) 72. The ADC operates at a predetermined sampling rate, which can be the same as that of the DAC 30. More oversampling can applied in ADC 72, e.g., ADC 72 can be operating at twice the sampling frequency as DAC 30.

Digital samples for the inphase (I) and quadrature (Q) components are passed to the OFDM receiver DSP unit 64 where they are converted by Serial-to-parallel converter 80. Then, prior to the conventional OFDM processing described below, the CD experienced by the signal is first compensated in the frequency-domain by using a FFT/IFFT pair (82 and 83) with equal length of digital samples ($N_{fft}^{CD}=N_{ifft}^{CD}$). This equal length is greater than the length of a FFT 84 used for OFDM subcarrier demultiplexing of the received signal ($N_{fft}^{OFDM}$). As shown in FIG. 1, in one embodiment, the equal length of the FFT/IFFT pair for CD compensation is two-thousand-forty-eight (2048) and the size of the FFT used for subcarrier demultiplexing is one-hundred-twenty eight (128). Other lengths may be utilized for the FFT/IFFT pair and the FFT used for subcarrier demultiplexing. For example, the equal length may be $2^N$ times as long as the length of the FFT used for OFDM subcarrier demultiplexing, wherein N is a positive integer. In another embodiment, the equal length may be a multiple of the length of the FFT used for OFDM subcarrier demultiplexing.

The compensating of the method may utilize an overlap-and-add approach to avoid CD-induced inter-block-interference (IBI) between FFT/IFFT blocks. Accordingly, overlapping block module 86 first groups incoming samples of the received signal into overlapped blocks, each block having a first length of total samples and a second length of samples overlapping with each left and right neighboring blocks. For example, each block may have a first length of two-thousand-forty-eight (2048) samples and a second length of two-hundred-seventy-four (274) overlapping samples with each left and right neighboring blocks. Other sample lengths for the block and overlap may be utilized.

According to the "overlap-and-add" approach, the overall overlapping samples per block to accommodate the CD-induced IBI is twice the second length of overlapping samples. There will be five-hundred-forty-eight (548) overall overlapping samples according to the previous example. Using the example described earlier, the CD-induced channel memory length is 544 samples, which is smaller than the overall overlapping samples (548), so the CD-induced IBI can be tolerated without penalty. In effect, the time duration corresponding to the second length of overlapping samples is preferably larger than half of the CD-induced channel memory duration.

CD compensation provided by CD compensation module 88 is based on a predetermined CD value corresponding to the negative of the CD experienced by the signal over the fiber link. The output samples from the CD compensation process are reconnected by overlap-and-add module 90, which removes the overlapping samples. For example, the overlap-and-add module may remove the overlapping samples leading to 1500 samples per FFT/IFFT block for further processing.

The reconnected samples then go through the OFDM receiver processes including frame synchronization, frequency estimation (FE), GI removal, FFT of length $N_{fft}^{OFDM}$ for OFDM subcarrier de-multiplexing, training-symbol (TS) assisted channel estimation and compensation (to equalize dynamic channel effects such as PMD), pilot-assisted common phase error compensation (PA-CPEC), and demodulation, and symbol mapping in respectively named modules in order to extract the original data.

As illustrated in FIG. 1, symbol synchronization and frequency estimation is performed by synchronization/FE module 92, which may include the extraction of training symbols for channel estimation that minimizes the detrimental effects such as PMD and CD on each OFDM subcarrier at the receiver digital signal processor (DSP) 60. The receiver DSP also includes a module for GI removal 93, OFDM subcarrier de-multiplexing via a FFT of length $N_{fft}^{OFDM}$, channel estimation 94, channel compensation 95, pilot-assisted common phase error compensation (PA-CPEC) 96, symbol mapping 97, and parallel-to-serial conversion 98 leading to a reconstruction of the original data provided to the transmitter.

At the receiver digital signal processor (DSP) 64, synchronization/FE module 92 extracts training symbols which are used for channel estimation in order to minimize the effects polarization-mode dispersion and chromatic dispersion on each OFDM subcarrier as compensated by channel compensation module 72. Symbol synchronization may also be performed by synchronization/FE module 92.

Channel compensation module 95 may include rough electronic dispersion compensation (EDC) just after FFT module 84 and before compensating based on correlated dual-polarization training symbols (CDPTS-based CE) and Intra-Symbol Frequency Domain Averaging (ISFA-based CE) as described above. Channel compensation module 95 may also provide fine EDC and pilot-assisted common phase error compensation (PA-CPEC) 96 is provided by a similarly named module.

In the FFT module 84, the length of the FFT used for OFDM subcarrier demultiplexing, $N_{fft}^{OFDM}$, may satisfy the condition $N_{fft}^{OFDM} < f_s^{RX}/(100 \text{ MHz})$, where $f_s^{RX}$ is a sampling frequency at which the digital samples are sampled. This condition assures that the allowable range of laser frequency offset is at least [−50 MHz, 50 MHz].

From the FFT module 84 is obtained a channel matrix which is further compensated by channel estimation 94 and channel compensation 95 module. The obtained channel matrices at different subcarrier frequencies are inverted and applied to the subcarriers in the payload symbols for channel compensation that realizes polarization de-multiplexing, and compensation of PMD, CD, and/or PDL. The other signal processes needed to recover the original data are performed by other modules identified above and the transmitted signal is recovered for each subcarrier.

Embodiments according to the invention provide at least one of several advantages by allowing for (even in the presence of large CD) (1) smaller GI (leading to higher transmission spectral efficiency); (2) a much shorter OFDM symbol (leading to larger subcarrier spacing and thus higher tolerance to laser phase noise and the frequency offset between the transmitter laser and the OLO; (3) shorter preamble symbols and training symbols (leading to lower frame overhead and thus higher transmission spectral efficiency, and lower computational load for channel synchronization, FE, and channel estimation); and (4) shorter OFDM frame (leading to higher channel tracking speed, and higher tolerance to clock or sampling frequency offset between the transmitter DAC and the receiver ADC).

FIG. 2 summaries key advantages of embodiments of the invention over the conventional CO-OFDM approaches. FIG. 2 is an illustrative table that compares the overhead needed for GI and the maximum allowable frequency offset between the OLO of the receiver and the transmitter laser in conventional OFDM system using $N_{ifft}^{OFDM} N_{fft}^{OFDM} = 2048$ to an exemplary embodiment of HSE-OFDM according to the invention. In the conventional OFDM system, no additional dispersion compensation is performed prior to OFDM receiver signal processing. The figure details overhead and the maximum allowable frequency offset between the OLO and the transmitter laser for a system reach comprising a number of standard single-mode fiber (SSMF) spans. The sampling frequency of the DAC and ADC used is assumed to be 56 GSamples/s.

The overhead needed for GI is defined as the ratio between the GI length and the length of the IFFT used for the OFDM subcarrier multiplexing. $|\Delta f_{max}|$ is the maximum allowable frequency offset between the OLO and the transmitter laser. In practical systems, it is very difficult to control the frequency offset to be less than 30 MHz, while it is relatively easy to control the frequency offset to be less than 200 MHz. Embodiments of an optical OFDM receiver according to the invention permit a fixed GI overhead of 6.25 percent and a fixed maximum allowable frequency offset of 218 MHz for a variety of system reaches. Note also that new types of large-core-area fibers usually have larger CD coefficient (e.g., 21~24 ps/nm/km) than SSMF (17 ps/nm/km), so the overhead required in the conventional approach would be even higher for future systems using these new types of fibers, making the approach the embodiments of the invention even more advantageous.

One "expense" to be paid when utilizing embodiments according to the invention is additional DSP processing to perform dispersion compensation before OFDM subcarrier demultiplexing. However, due to the DSP efficiency of OFDM, the overall DSP complexity of the provide embodiments would be expected to be similar to that based on blind channel estimation while at the same time offering the capability of easy and flexible data rate/format adaptation and other OFDM benefits.

For example, for a system with 1,500 km SSMF reach, the conventional approach requires 100% overhead for GI with 54.7 MHz as the maximum allowable frequency offset between the OLO and the transmitter laser. According to embodiments of the invention, the same 1,500 SSMF reach can be provided with only 6.25% overhead for GI and a 218 MHz as the maximum allowable frequency offset between the OLO and the transmitter laser. Likewise, the required overhead and maximum allowable frequency offset between the OLO and the transmitter laser are constant for a variety of system reaches.

All of the functions described above with respect to the exemplary method are readily carried out by special or general purpose digital information processing devices acting under appropriate instructions embodied, e.g., in software, firmware, or hardware programming. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

What is claimed is:

1. A method comprising
compensating in an optical Orthogonal Frequency Division Multiplexing (OFDM) receiver for chromatic dispersion (CD) experienced by a received signal, wherein said compensating is performed in the frequency-domain using a Fast Fourier Transform/Inverse Fast Fourier Transform (FFT/IFFT) pair with equal length of digital samples prior to OFDM receiver signal processing, wherein the equal length is greater than the length of a FFT used for OFDM subcarrier demultiplexing of the received signal.

2. The method of claim 1 wherein said compensating utilizes an overlap-and-add approach.

3. The method of claim 2 wherein the overlap-and-add approach comprises:
grouping incoming samples of the received signal into overlapped blocks, each block having a first length of total samples and a second length of samples overlapping with each left and right neighboring blocks.

4. The method of claim 3 wherein the time duration corresponding to each block is at least twice as large as the CD-induced channel memory duration.

5. The method of claim 3 wherein the time duration corresponding to the second length of overlapping samples is larger than half of the CD-induced channel memory duration.

6. The method of claim 1 wherein the equal length is $2^N$ times as long as the length of the FFT used for OFDM subcarrier demultiplexing, wherein N is a positive integer.

7. The method of claim 1 wherein the length of the FFT used for OFDM subcarrier demultiplexing, $N_{fft}^{OFDM}$, satisfies $$N_{fft}^{OFDM} < f_s^{RX}/(100 \text{ MHz}),$$

where $f_s^{RX}$ is a sampling frequency at which the digital samples are sampled.

8. The method of claim 1 wherein the compensating for CD comprises:
converting the digital samples representing the received signal from the time domain to the frequency domain by using the FFT of the FFT/IFFT pair having a length $N_{fft}^{CD}$;
imposing a frequency-dependent phase profile on the converted frequency-domain samples; and
converting the frequency-domain samples back to the time domain by using the IFFT of the FFT/IFFT pair having a length $N_{ifft}^{CD}$.

9. The method of claim 8 wherein the imposed frequency-dependent phase profile is opposite to that imposed by the CD experienced by the received signal.

10. The method of claim 9 wherein the frequency-dependent phase profile imposed by fiber CD is estimated from iteration.

11. The method of claim 1 wherein said OFDM receiver signal processing includes at least one of frame synchronization, frequency estimation, OFDM subcarrier de-multiplexing, training-symbol assisted channel estimation and compensation, frequency offset compensation, phase estimation and compensation, demodulation, and data recovery.

12. The method of claim 1 further comprising:
receiving a signal having a Guard Interval (GI) having a duration shorter than 10% of the OFDM symbol duration.

13. The method of claim 1 wherein the received signal has a Guard Interval (GI), and wherein the GI has a length longer than a memory length associated with polarization-mode dispersion (PMD).

14. An optical communication system comprising:
an optical Orthogonal Frequency-Division Multiplexed (OFDM) receiver for receiving an optical OFDM signal, the optical OFDM receiver comprising
a compensation module configured to compensate the received optical OFDM signal for fiber chromatic dispersion experienced thereupon during transmission, the module including a Fast Fourier Transform/Inverse Fast Fourier Transform (FFT/IFFT) pair configured to compensate the optical OFDM signal in the frequency domain, the FFT/IFFT pair having an equal first length of digital samples, the first length greater than a second length of a FFT used for subcarrier demultiplexing the received signal.

15. The optical communication system of claim 14 wherein the compensation module comprises:
an overlap-and-add module, wherein the overlap-and-add module is configured to group incoming samples of the received signal into overlapped blocks, each block having a first number of total samples and a second number of samples overlapping with each left and right neighboring blocks.

16. The optical communication system of claim 14 wherein the first length is a multiple of the second length.

17. The optical communication system of claim 14 wherein the optical OFDM receiver further comprises
at least one of a frame synchronization module, a frequency estimation module, a subcarrier de-multiplexing module, a training-symbol assisted channel estimation and compensation module, a frequency offset compensation module, phase estimation and compensation module, a demodulation module, and a data recovery module for processing the received optical OFDM signal after compensation by the compensation module.

18. The optical communication system of claim 14 wherein the received signal has a Guard Interval (GI), and wherein the GI has a length longer than a memory length associated with polarization-mode dispersion (PMD).

19. The optical communication system of claim 14 further comprising:
an optical OFDM transmitter for generating the optical OFDM signal provided to the optical OFDM received, the optical OFDM transmitter comprising:
an IFFT module of length $N_{ifft}^{OFDM}$ for subcarrier multiplexing, wherein $N_{ifft}^{OFDM}$ corresponds to the second length $N_{fft}^{OFDM}$.

20. The optical communication system of claim 14 wherein the OFDM transmitter further comprises:
a guard-interval (GI) insertion module, the GI insertion module for allocating a guard-interval (GI) that is at least 10 times shorter than the length of the IFFT used for OFDM subcarrier multiplexing.

21. The optical communication system of claim 14 wherein the length of the FFT used for OFDM subcarrier demultiplexing, $N_{fft}^{OFDM}$, satisfies $$N_{fft}^{OFDM} < f_s^{RX}/(100 \text{ MHz}),$$

where $f_s^{RX}$ is a sampling frequency at which the digital samples are sampled, likewise the length of the IFFT used for OFDM subcarrier multiplexing, $N_{ifft}^{OFDM}$ satisfies $$N_{ifft}^{OFDM} < f_s^{TX}/(100 \text{ MHz}),$$

where $f_s^{TX}$ is the sampling frequency of the digital-to-analog converter (DAC) used in the OFDM transmitter.

* * * * *